(12) United States Patent
Thorat et al.

(10) Patent No.: US 8,489,365 B2
(45) Date of Patent: Jul. 16, 2013

(54) SYSTEM AND METHOD FOR MEASURING GREENNESS OF AN INFORMATION TECHNOLOGY ENVIRONMENT

(75) Inventors: Nishant Thorat, Maharashtra (IN); Srikanth Nalluri, Andhrapradesh (IN); Sushanta Pradhan, West Bengal (IN)

(73) Assignee: CA, Inc., Islandia, NY (US)

( * ) Notice: Subject to any disclaimer, the term of this patent is extended or adjusted under 35 U.S.C. 154(b) by 442 days.

(21) Appl. No.: 12/507,581

(22) Filed: Jul. 22, 2009

(65) Prior Publication Data

US 2011/0022359 A1    Jan. 27, 2011

(51) Int. Cl.
*G06F 11/30* (2006.01)
(52) U.S. Cl.
USPC .......................................................... 702/186
(58) Field of Classification Search
USPC .......................................................... 702/186
See application file for complete search history.

(56) References Cited

U.S. PATENT DOCUMENTS

| 6,666,049 B1 * | 12/2003 | Katende et al. | 62/656 |
| 2009/0112663 A1 * | 4/2009 | Benayon et al. | 705/7 |
| 2010/0031182 A1 * | 2/2010 | Thean | 715/772 |

* cited by examiner

*Primary Examiner* — Mohamed Charioui
(74) *Attorney, Agent, or Firm* — Baker Botts, LLP

(57) ABSTRACT

A computer-implemented method for measuring the "greenness" of an IT environment is provided. The method comprises extracting asset data from a plurality of IT assets located on a network and extracting one or more greenness attributes from each of the plurality of IT assets. Key performance indicators are calculated, using the one or more greenness attributes, for each of the plurality of IT assets, and the key performance indicators are presented to a user in a graphical user interface. According to more particular embodiments, the greenness attributes comprise numerical values representing one or more of power requirements, power consumption, and resource utilization.

15 Claims, 6 Drawing Sheets

SYSTEM AND METHOD FOR MEASURING GREENNESS OF AN INFORMATION TECHNOLOGY ENVIRONMENT

TECHNICAL FIELD

The present disclosure relates generally to IT resource management, and more specifically to a system and method for measuring greenness of an IT environment.

BACKGROUND

In today's society, there is an increasing desire for environmentally friendly, or "green" products and services. Additionally, as technology advances, there is an increasing reliance on computers and other information technology (IT) resources. Since these IT resources often consume a lot of power, it is desirable to have green IT resources. This may be used as a tool for cost savings and environmental awareness.

SUMMARY OF EXAMPLE EMBODIMENTS

The present disclosure is directed to a system and method for measuring greenness of an IT environment. The teachings of the present disclosure may allow for a measured approach to the deployment of IT assets to balance power savings and IT performance for an entire organization.

In accordance with a particular embodiment of the present disclosure, a computer-implemented method is provided. The method comprises extracting asset data from a plurality of IT assets located on a network and extracting one or more greenness attributes from each of the plurality of IT assets. Key performance indicators are calculated, using the one or more greenness attributes, for each of the plurality of IT assets, and the key performance indicators are presented to a user in a graphical user interface. According to more particular embodiments, the greenness attributes comprise numerical values representing one or more of power requirements, power consumption, and resource utilization.

In accordance with another aspect of the present invention, a system is provided, comprising one or more processors and memory coupled to the one or more processors and configured to store program instructions. The program instructions are executable by the one or more processors to implement extracting asset data from a plurality of IT assets located on a network and extracting one or more greenness attributes from each of the plurality of IT assets. The program instructions are further operable to implement calculating key performance indicators, using the one or more greenness attributes, for each of the plurality of IT assets and presenting the key performance indicators to a user in a graphical user interface.

In accordance with another aspect of the present invention, a tangible computer readable medium encoded with logic is provided. The logic is operable, when executed on a processor, to implement extracting asset data from a plurality of IT assets located on a network and extracting one or more greenness attributes from each of the plurality of IT assets. The logic is further operable to implement calculating key performance indicators, using the one or more greenness attributes, for each of the plurality of IT assets and presenting the key performance indicators to a user in a graphical user interface.

Technical advantages of particular embodiments of the present disclosure include a system and method for measuring the greenness of an IT environment. This may allow an IT administrator to more easily view and understand the power consumption and energy efficiency of various IT resources throughout an organization. This may provide an automated, organized way to determine improved configurations for improved power and cost savings.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Organizations and enterprises increasingly rely on IT resources for their day-to-day operations. While these resources provide many different benefits, they may also consume a great deal of power. It is often desirable to increase the "greenness" of these resources. This may provide for resources that are more energy efficient, providing both cost-savings and a decreased environmental impact. However, it may be difficult to efficiently balance these considerations and make adjustments across an organization.

In accordance with the teachings of the present disclosure, a system and method for measuring the greenness of an IT environment is provided. An object of the present disclosure is to provide an automated, organized way to improve the greenness of an IT environment.

According to particular embodiments of the present disclosure, a computer-implemented method is provided. The method comprises extracting asset data from a plurality of IT assets located on a network and extracting one or more greenness attributes from each of the plurality of IT assets. Key performance indicators are calculated, using the one or more greenness attributes, for each of the plurality of IT assets, and the key performance indicators are presented to a user in a graphical user interface. According to more particular embodiments, the greenness attributes comprise numerical values representing one or more of power requirements, power consumption, and resource utilization. As used throughout this disclosure, "each" means every one of at least a subset of the identified items.

Figure 1:
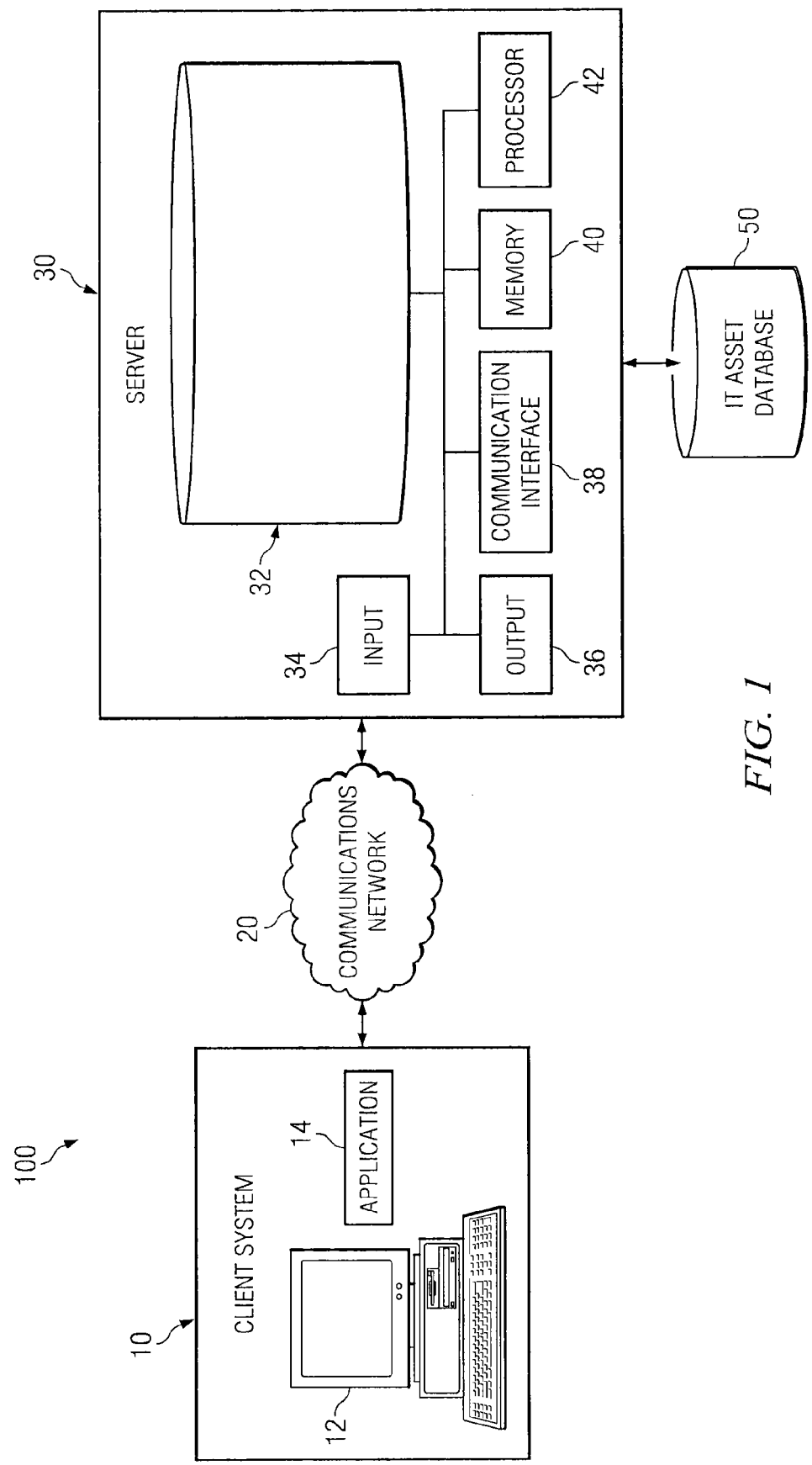
FIG. 1 is a schematic drawing illustrating a computer network configuration suitable for use within particular embodiments of the present disclosure.

FIG. 1 illustrates a communications system, generally designated by reference numeral 100. Communications system 100 includes client system 10, communications network 20, server 30, and IT asset database 50.

Client system 10 includes a computer terminal 12, or other medium for accomplishing electronic communication. Terminal 12 may also include specific software, including an application 14 that allows standardized communication with server 30. Although the illustrated embodiment depicts client system 10 as a separate element, in alternative embodiments client system 10 may reside locally on server 30.

Server 30 may refer to any device that is operable to deliver information that is sent to the client system 10. According to the illustrated embodiment, server 30 includes storage device 32, an input device 34, an output device 36, a communication interface 38, a memory device 40, and a processor 42.

Input device 34 may refer to any suitable device that is operable to input, select, and/or manipulate various data and information. Input device 34 may include, for example, a keyboard, mouse, graphics tablet, joystick, light pen, microphone, scanner, or other suitable input device.

Output device 36 may refer to any suitable device that is operable for displaying information to a user. Output device 36 may include, for example, a video display, a printer, a plotter, or other suitable output device.

Communication interface 38 may refer to any suitable device that is operable to receive input for server 30, send output from server 30, perform suitable processing of the input or output or both, communicate to other devices, or any combination of the preceding. Communication interface 38 may include appropriate hardware (e.g. modem, network interface card, etc.) and software, including protocol conversion and data processing capabilities, to communicate through a LAN, WAN, or other communication system that allows server 30 to communicate to other devices. Communication interface 38 may include one or more ports, conversion software, or both.

Memory device 40 may refer to any suitable device operable to store and facilitate retrieval of data, and may comprise random access memory (RAM), read only memory (ROM), a magnetic drive, a digital video disk (DVD) drive, removable media storage, any other suitable data storage medium, or a combination of any of the preceding.

Processor 42 may refer to any suitable device operable to execute instructions and manipulate data to perform operations for server 30, such as the retrieval of asset data, extraction of greenness attributes, and calculation of key performance indicators (KPIs). Processor 42 may include, for example, any type of central processing unit (CPU).

Storage device 32 may refer to any suitable device operable for storing data and instructions. Storage device 32 may include, for example, a magnetic disk, flash memory, optical disk, or other suitable data storage device.

An IT asset database may be a database that contains relevant information about components used in an organization's IT services, as well as the relationships between those components. IT asset database 50 may refer to any database conforming to this style. In the illustrated embodiment, IT asset database 50 is positioned external to server 30. However, according to alternative embodiments, IT asset database 50 may be located on client system 10, in storage device 32, or elsewhere on server 30. In particular embodiments, IT asset database 50 may be accessed using a web-based application.

Application 14 may provide a graphical user interface, or "dashboard" for a user to manage IT assets and analyze KPIs relating to the greenness of those attributes. KPIs are generally any measure or metric that helps evaluate how successful an organization is, typically in terms of making progress toward a long-term goal. According to the present disclosure, KPIs may be any measure or metric relating to the greenness of various IT assets in a network. According to particular embodiments of the present disclosure, these KPIs may be calculated using "greenness attributes" of various IT assets. As used herein, greenness attributes may be any attributes that relate to the energy requirements, consumption, or efficiency of an IT asset. FIGS. 2-5 illustrate various views of the dashboard, as displayed on user computer 12, according to particular embodiments of the present disclosure. These are provided as illustrative examples only, and many other variations and data displays may actually be provided.

Figure 2:
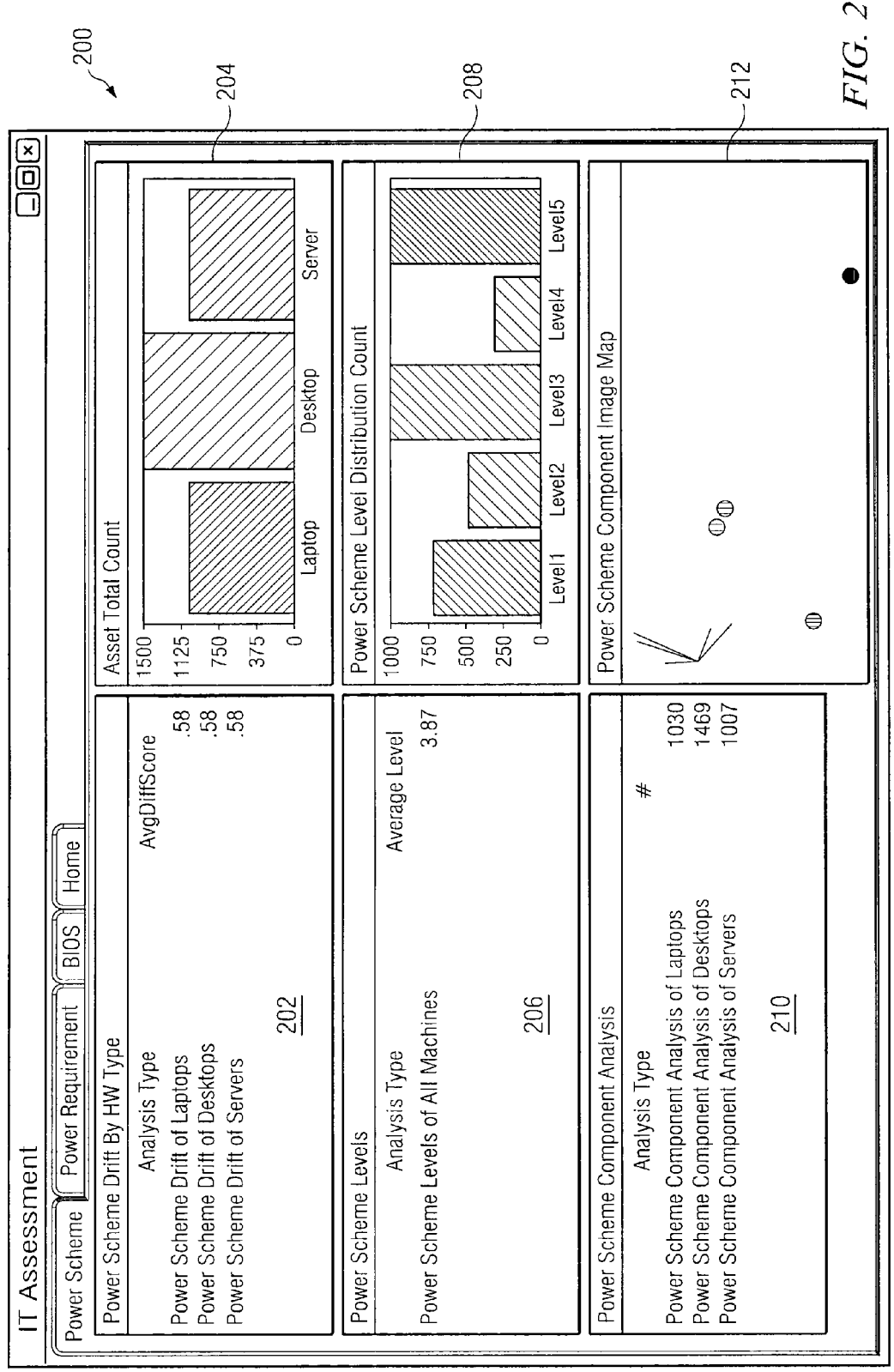
FIG. 2 is a schematic drawing illustrating a graphical user interface, according to particular embodiments of the present disclosure.

FIG. 2 illustrates a graphical user interface, according to particular embodiments of the present disclosure, generally designated by reference numeral 200. This view may be referred to as the home page of the dashboard, as it provides a basic overview of greenness data, with options to easily navigate to more detailed or related information. This page may include a series of individual informational portlets or small windows, arranged in various combinations of columns and rows. These portlets may represent any analysis of IT assets, including but not limited to summary counts, corresponding charts, analysis, and relevant links. For instance, in the illustrated embodiment, portlet 202 displays an analysis of power scheme drift by hardware type. Portlet 204 displays a chart showing the total IT asset count. Portlet 206 displays an analysis of power scheme levels. Associated portlet 208 displays a chart illustrating the power scheme level distribution of the various IT assets. Portlet 210 displays an analysis of the power scheme component analysis. Related portlet 212 displays an image map of the power scheme component analysis. These are only a few examples of the analysis and KPIs that may be displayed. A more complete discussion will follow below with reference to the remaining figures.

Although the illustrated embodiment displays a particular arrangement of portlets, in various embodiments, some, none, or all of the portlets may be displayed. According to particular embodiments, the portlets displayed and/or their arrangement may be customizable by a user.

Figure 3:
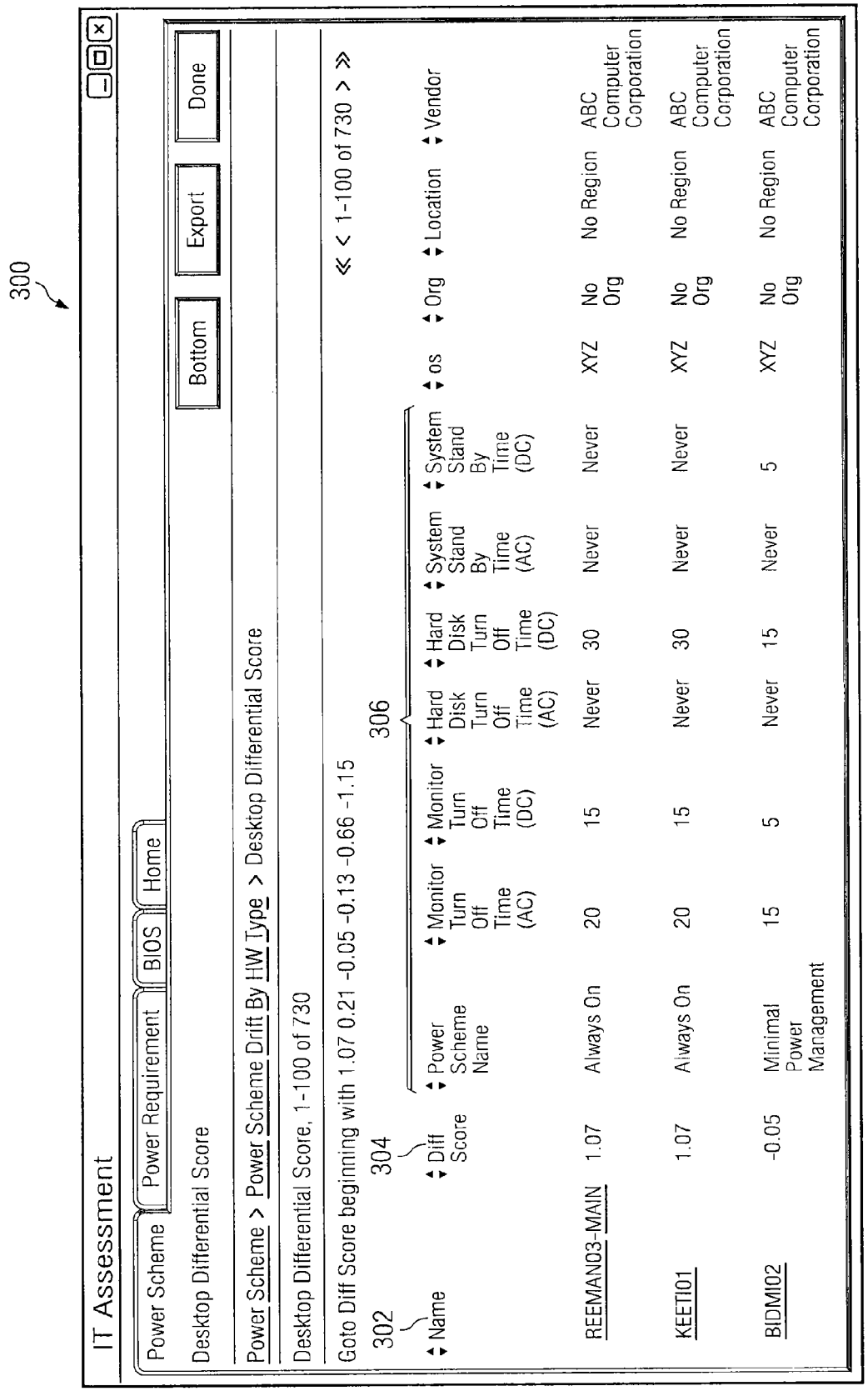
FIG. 3 is a schematic drawing illustrating a graphical user interface, according to particular embodiments of the present disclosure.

FIG. 3 illustrates a graphical user interface, according to particular embodiments of the present disclosure, generally designated by reference numeral 300. Specifically, interface 300 displays a listing of the differential score, or "drift" of one or more particular assets. In the illustrated embodiment, column 302 lists the name of IT assets, along with various details about the asset, such as operating system organization, physical location, and vendor. Additionally, a drift score 304 and various greenness attributes 306 are displayed.

Drift may refer to a particular type of KPI. Drift uses a primary statistical analysis to measure how far an asset is from a baseline value, such as the center or mean value, of a population under review. However, according to particular embodiments, the baseline value may be customizable by a user. The larger the differential score, either positive or negative, the farther it is away from the normal or standard asset for the population. For a given asset, drift may be calculated for any one or more greenness attribute. If only one greenness attribute is used, the differential score for that particular attribute is calculated and displayed as the drift for the given asset. In the illustrated embodiment, a plurality of greenness attributes are used, including Monitor Turn Off Time (AC), Monitor Turn Off Time (DC), Hard Disk Turn Off Time (AC), Hard Disk Turn Off Time (DC), System Standby Time (AC), and System Standby Time (DC). When a plurality of attributes are used, an individual differential score is calculated for each of the attributes. Those individual differential scores may then be averaged together and displayed as the drift for the given asset.

The use of a customizable baseline value may help a user to more fully measure the efficiency of an organization. For instance, various organizations may have different power requirements. According to particular embodiments, one organization may need certain IT assets to run all day long, whereas another organization may only need them to run during an 8 hour business day. The ability to set the baseline value for use in drift measurements may help a user to more easily view and take these differences into account.

Figure 4:
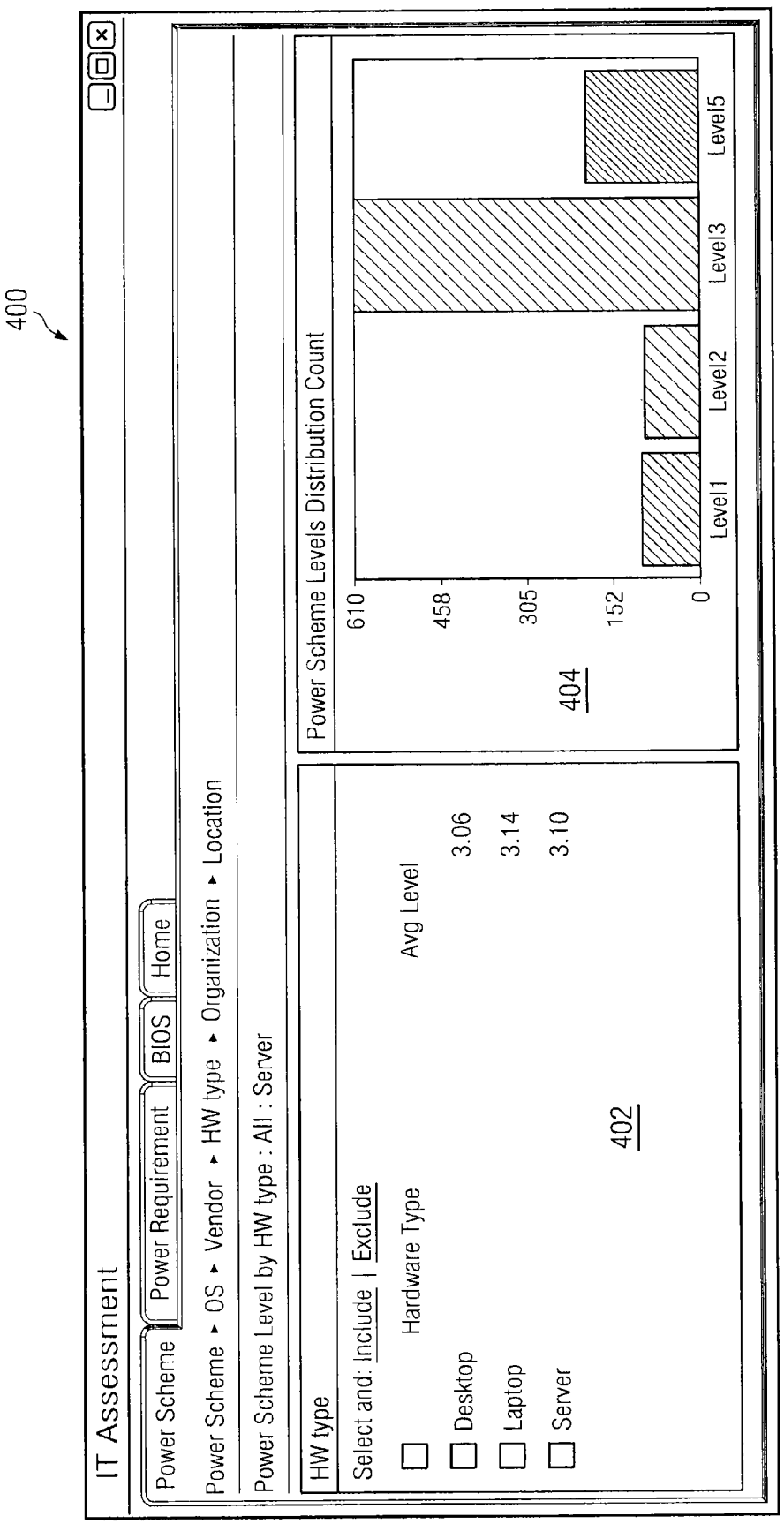
FIG. 4 is a schematic drawing illustrating a graphical user interface, according to particular embodiments of the present disclosure.

FIG. 4 illustrates a graphical user interface, according to particular embodiments of the present disclosure, generally designated by reference numeral 400. Specifically, interface 400 displays information about the "level" of one or more particular assets. In the illustrated embodiment, interface 400 includes portlet 402, which provides an analysis of the average level of assets, organized by hardware type. Additionally in the illustrated embodiment, interface 400 includes portlet 404, which provides a graphical display of the power scheme level distribution count.

Level may refer to a particular type of KPI that provides a grouping or clustering of an asset population based on specified greenness attributes. Specifically, for a given asset population, standardization scores, or z-scores, are calculated based on one or more greenness attributes. Next, levels may be determined by using statistical clustering methods to group the assets into various groups. According to particular embodiments, assets placed in the lowest level may be the most energy efficient, while assets placed in the highest level may be the least energy efficient. Any number of levels may be used. According to particular embodiments, the number of levels may be customizable, based on user preference. Similar to drift values, levels may also be customizable by a user. For instance, different levels can be set for different organizations to take into account different power requirements.

Figure 5:
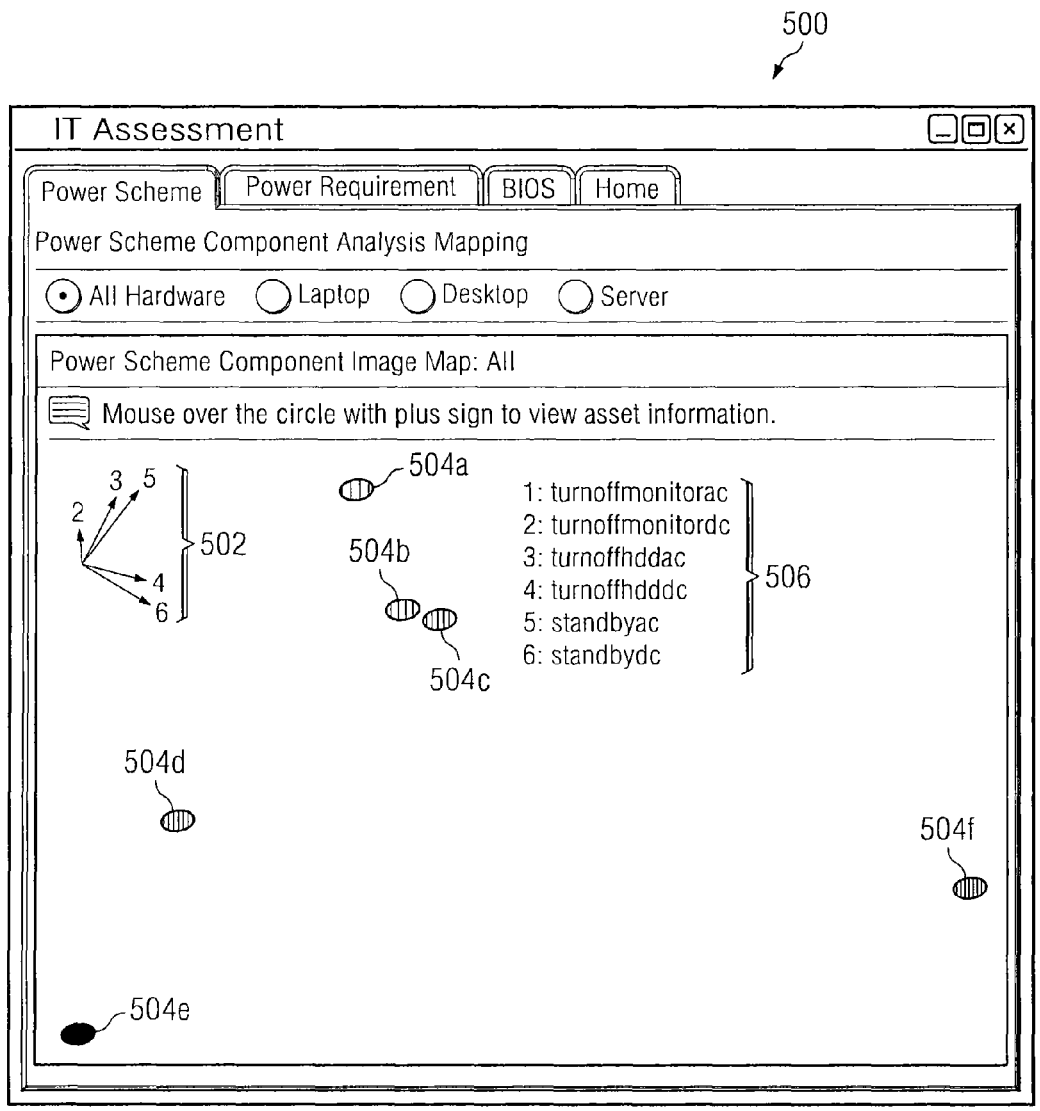
FIG. 5 is a schematic drawing illustrating a graphical user interface, according to particular embodiments of the present disclosure.

FIG. 5 illustrates a graphical user interface, according to particular embodiments of the present disclosure, generally designated by reference numeral 500. Specifically, interface 500 displays a "component analysis" of one or more particular assets. In the illustrated embodiment, interface 500 includes component axes 502. Each of the component axes may correspond to a particular greenness attribute. Legend 506 lists the greenness attributes that are used in preparing the axes and component image map. According to the illustrated embodiments, particular IT assets are displayed on the image map in the form of circles 504a-504f. Each of the circles may have a particular color representing the greenness of the particular asset. According to the illustrated embodiment, the least green or least energy efficient assets are represented by the color red, while the most green or most energy efficient assets are represented by the color blue.

Component analysis may refer to a particular type of KPI that maps a multi-dimensional element onto a two-dimensional map. The component image map 500 uses a method called principle component analysis to perform this mapping. In the present application, this method may be used to provide an image map that more simply displays the greenness of multiple IT assets that have a multitude of greenness attributes. For instance, in the illustrated embodiment, six different greenness attributes are used to create an image map, as listed in legend 506. According to the illustrated embodiment, these attributes are Monitor Turn Off Time (AC), Monitor Turn Off Time (DC), Hard Disk Turn Off Time (AC), Hard Disk Turn Off Time (DC), System Standby Time (AC), and System Standby Time (DC). According to alternative embodiments, more or less greenness attributes may be used to create the image map. Regardless of the number of greenness attributes used, this method may be optimized to find the best resulting axes to differentiate data. Therefore, each representation of data will have a unique set of axes.

Figure 6:
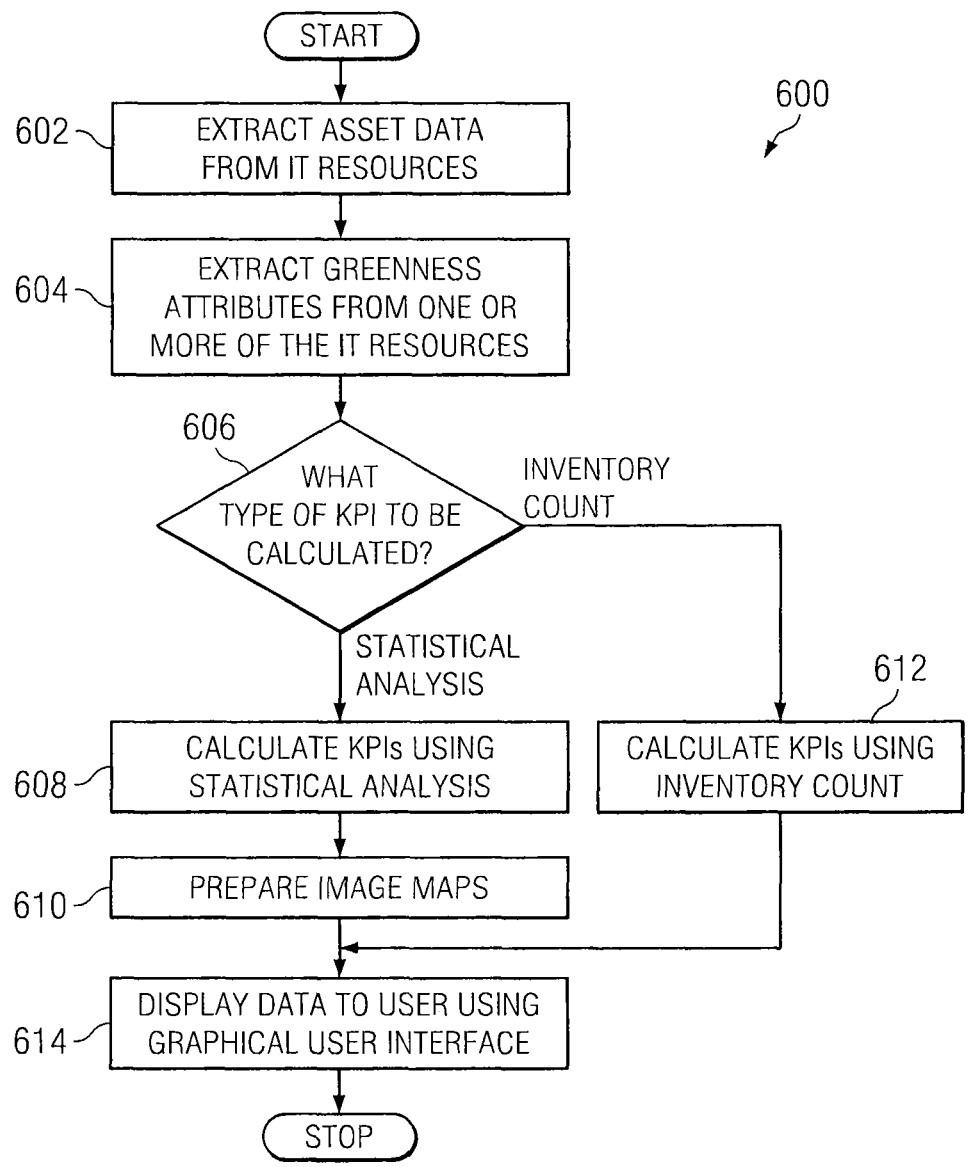
FIG. 6 is a flow diagram illustrating a method for measuring the greenness of an IT environment, according to particular embodiments of the present disclosure.

FIG. 6 is a flow diagram illustrating a method for measuring the greenness of an IT environment, according to particular embodiments of the present disclosure. The specific steps of FIG. 6 will be described in detail below with reference to elements illustrated in FIGS. 1-5.

The method begins at step 602, where asset data is extracted from IT resources. Asset data may include any general information about various IT resources, including but not limited to asset name, operating system, organization, geographic location, and vendor. Asset data may also include more specific information, including but not limited to number of CPUs, memory (RAM) size, hard disk capacity, and power attributes such as monitor turnoff time. These types of asset data are listed for illustrative purposes only, and one of ordinary skill in the art would appreciate that various other types of data may be included. This information may be stored for all types of IT assets within an organization, including, but not limited to desktop computers, laptop computers, and servers. According to the illustrated embodiment, this information may be stored in IT asset database 50. Although only one database is shown in the illustrated embodiment, in alternative embodiments, multiple IT asset databases may be used.

According to particular embodiments, step 602 may be triggered whenever a user of application 14 on client system 10 wishes to analyze the greenness of one or more IT assets. In those embodiments, the application 14 may contact IT asset database 50 through server 30 to obtain the relevant IT asset data. Alternatively, this information may be maintained in local storage on client system 10 and regularly updated whenever application 14 connects to IT asset database 50.

At step 604, greenness attributes are extracted from one or more of the IT resources. Similar to step 602, this step may be triggered whenever a user of application 14 wishes to analyze the greenness of one or more IT assets, or the information may be maintained in local storage and regularly updated automatically. Although steps 602 and 604 are depicted as separate steps, in alternative embodiments, they may be performed at the same time. Greenness attributes may be any attributes that relate to the greenness or energy efficiency of an IT asset. These may include, but are not limited to monitor and hard disk turn off time, standby time, various power requirements, CPU utilization in time bands, BIOS version, processor power technologies, BIOS ACPI setting, and compliance with green IT standards. The particular type of greenness attributes extracted may depend on the different measurements a user wishes to look at. These different types of measurements may include, but are not limited to power scheme, power requirement, resource utilization, BIOS information, and standards compliance.

Power scheme measurements provide information about how IT assets are consuming power efficiently, and may be useful to determine or control the power usage of IT assets. This may help a user reduce power consumption and reduce costs by determining whether assets are poorly configured for the functions they perform. For instance, a computer that is over-configured to do more than is necessary may use more power. Additionally, power scheme measurements may help determine if any assets need modification in the power management configuration. Greenness attributes used to calculate Power Scheme measurements may include, but are not limited to Monitor Turn Off Time (AC), Monitor Turn Off Time (DC), Hard Disk Turn Off Time (AC), Hard Disk Turn Off Time (DC), System Standby Time (AC), and System Standby Time (DC). This may be helpful, as end users' performance may decrease while using over-configured assets that take a long time to power up or turn off. Additionally, an organization may be wasting support costs for power consumption by assets that are idle or poorly configured.

Power requirement measurements look at the power required by particular assets. According to particular embodiments, this may be a value provided by the vendor of an asset, and may correspond to a maximum value of power required. This may help a user determine if there are assets that should be replaced because of excessive power requirements. The greenness attributes used to calculate Power Requirement measurements may include, but are not limited to the minimum, maximum, and standby power requirements, as measured in Watts or similar unit of power. This may be helpful, as high power requirements may increase operating costs. For instance, end users' productivity may be decreased because outdated systems are being used that cannot handle the necessary workload. Additionally, a user can analyze the power requirements of similar assets from differing vendors, and use this information in determining vendors to use for future acquisitions.

Resource utilization measurements look at how effectively IT assets are being utilized across an IT environment. For instance, these measurements may help determine which assets are being over-utilized and which assets are being under-utilized. Based on this information, it may help determine which under-utilized systems can take on more workload. The greenness attributes used to calculate Resource Utilization measurements may include, but are not limited to the average CPU utilization during core business hours, early business hours, and late business hours. According to particular embodiments, these time segments may be divided into three time bands of eight hours each (i.e. core hours 9 AM-5 PM, late hours 5 PM-1 AM, and early hours 1 AM-9 AM). According to alternative embodiments, different time segments may be employed. This information be helpful, as inefficient resources may necessitate the deployment of extra resources. Knowing this, a user can deploy fewer, but more efficient resources.

At step 606, it is determined what type of KPI is to be determined. As discussed above, KPIs are generally any measure or metric that helps evaluate how successful an organization is in terms of making progress toward a long-term goal. According to the present disclosure, KPIs may be any measure or metric relating to the greenness of various IT assets in a network. These KPIs may fall into two general categories: statistical analysis-based and inventory-based. Statistical analysis-based KPIs may use some form of statistical analysis or standardization of number-based greenness attributes to return a metric to the user. As will be described in more detail below, statistical analysis-based KPIs may include drift, level, and component analysis. Inventory-based KPIs, on the other hand, may rely on inventory-counts for non-number-based greenness attributes. As will be described in more detail below, inventory-based KPIs may include BIOS settings and standards compliance.

If statistical analysis-based KPIs are to be determined, the method proceeds to step 608, where various forms of statistical analysis are performed by processor 42 to calculate the KPI. As discussed above, drift is a type of KPI that measures how far an asset's greenness deviates from a baseline value for a group of assets. According to particular embodiments, this baseline value may be the average or mean value for the entire group of assets. According to alternative embodiments, this baseline value may be customizable to some other value, depending on user preference. Drift may be calculated for power schemes, power requirements, and resource utilization.

As discussed above, power scheme metrics may help a user determine whether assets are poorly configured for the functions they perform. Applying the drift KPI to power schemes, a user may determine how far away an asset is configured for power management from some baseline value, such as the average power scheme, for a particular population. The resulting value may be in decimal value, with zero representing the baseline. Therefore, positive numbers represent positive deviation, which may mean less greenness. Alternatively, negative numbers represent a negative deviation from the baseline, which may mean more greenness. According to particular embodiments, the drift range may be fixed, such as from −10.0 to +10.0. In alternative embodiments, different fixed ends or no fixed ends at all may be used.

User interface 300 illustrates a typical display regarding power scheme drift for several assets. In the illustrated embodiment, data is displayed in a tabular form. However, in alternative embodiments, different forms may be used to display data to the user, such as graphs or charts. In the illustrated embodiment, the first column 302 lists the name of various assets being analyzed. For each asset, individual greenness attributes 306 are listed. In the illustrated embodiment, those attributes include Monitor Turn Off Time (AC), Monitor Turn Off Time (DC), Hard Disk Turn Off Time (AC), Hard Disk Turn Off Time (DC), System Standby Time (AC), and System Standby Time (DC).

While this detailed information may be helpful to a user, the use of the drift KPI 304 may help the user to more quickly and easily evaluate the greenness of a particular asset with relation to a larger group of IT assets. For instance, in the illustrated embodiment, asset "REEMA03-MAIN" has a power scheme drift value of 1.07, while asset "BIDMI02" has a power scheme drift value of −0.05. Based on this, the user can quickly see that "BIDMI02" has a better power scheme based on power saving options. Based on this information, the user can identify that "REEMA03-MAIN" is using more power than an average asset. Based on this information, the user may replace this asset, re-configure it, or otherwise alter the arrangement of assets for more energy efficiency.

Although the illustrated embodiment shows drift for power scheme, the drift KPI may similarly be calculated and displayed for power requirement. As mentioned above, the greenness attributes used to calculate power requirement measurements may include, but are not limited to the minimum, maximum, and standby power requirements, as measured in Watts or similar unit of power. Therefore, using the power requirement drift value, a user can quickly evaluate which assets require more or less power than average.

Although the illustrated embodiment shows drift for power scheme, the drift KPI may similarly be calculated and displayed for resource utilization. As mentioned above, the greenness attributes used to calculate resource utilization measurements may include, but are not limited to the average CPU utilization during core business hours, early business hours, and late business hours. Therefore, using the resource utilization drift value, a user can quickly evaluate which assets have higher or lower CPU utilization at various times of the day. Based on this information, the user can identify assets that may be removed, re-configured, or reassigned.

As discussed above, level may refer to a grouping or clustering of an asset population based on specified greenness attributes. The level KPI may be applied to power schemes to show the power management configuration distribution of a group of assets. This may help a user to easily see how the power management configuration differs across power schemes, organization, asset type, geographic location, or other group distinctions.

User display 400 shows a typical power scheme level display. In the illustrated embodiment, portlet 402 displays the average level for assets by hardware type. According to particular embodiments, a user may select one of the hardware types from the list in order to get a more detailed listing. This may allow a user to drill down and get more specific information about certain assets or groups of assets.

Portlet 404 is a bar graph displaying distribution counts of power scheme levels. Each bar represents the number of assets within a given level. This particular embodiment shows assets by all hardware models. However, according to particular embodiments, a user may drill down and focus on particular hardware models (i.e. desktop, laptop, or server). Additionally, a user may select any of the bars to view a detailed list of assets contained within the selection. Although a bar graph is illustrated, any other suitable graphical display may be used. Additionally, although the illustrated embodiment displays two portlets, this display may be customizable by the user to display fewer or more portlets.

Power scheme level may also be used to analyze power scheme of assets based on requirements other than hardware type. For instance, a user may view the power scheme levels of assets with particular organizations, locations, operating systems, or any other particular type of asset data. This may allow a user to analyze how power scheme levels vary for a given type of asset across multiple parts of an organization, providing insight into where there is the potential for more power saving options.

Although the illustrated embodiment shows power scheme level, the level KPI may similarly be displayed for power requirement. This may be used to analyze the power requirements for different hardware models. Additionally, power requirement level may be used to examine the power requirement of assets across multiple vendors. For instance, a user can compare the levels of similarly-configured assets provided by different vendors to determine which vendor provides greener assets. This comparison may help a user in making future decisions on which vendors to use for acquiring particular hardware.

Although the illustrated embodiment shows power scheme level, the level KPI may similarly be displayed for resource utilization. This may provide grouping of assets based on their respective CPU utilization percentage. Therefore, these levels may allow a user to quickly and easily evaluate which systems are under-utilized and which systems are over-utilized. As with the other categories, grouping of resource utilization may also be done according to hardware type, organization, location, or vendor. This may assist a user in making decisions regarding shutting down under-utilized assets or shifting work from over-utilized assets to under-utilized assets.

As mentioned above, the component analysis KPI may provide a component image map to easily see assets that differ from a population. While looking at detailed listings of assets may be helpful, the component image map may allow a user to more quickly and easily determine which assets are more or less green. These image maps may be prepared at step 610. This may be particularly helpful to easily analyze components that have many different attributes.

In the illustrated embodiment, assets having multiple greenness attributes are mapped onto a two-dimensional graph 500. Legend 506 lists the different greenness attributes that are taken into consideration for the component analysis. Using principle component analysis, these multiple attributes are mapped onto two-dimensional axes 502. This allows a complex set of multi-dimensional data to be easily viewed in a two-dimensional form. According to the illustrated embodiment, particular assets may be displayed in the form of circles 504a-504f. The location and color of the circles may indicate the relative greenness of that particular asset. For instance, asset 504a is the lightest color, indicating that it is the most green, or energy efficient. Assets 504b and 504c are slightly darker, indicating that they are not as green as 504a. Finally assets 504e and 504f are the darkest circles, indicating that they are the least green, or energy efficient. According to particular embodiments, the individual assets may also be marked with a "+" sign. Clicking on this sign may allow the user to drill down and view more details about that specific asset. According to particular embodiments, all displayed assets may have this option. According to alternative embodiments, only the most green and least green may feature this option, since assets close to the average greenness may need little or no analysis or alteration.

Although the illustrated embodiment shows power scheme component analysis, the component analysis KPI may similarly be calculated and displayed for power requirements. This may provide an easier way to spot assets with high power requirements that may be replaced or decommissioned. Alternatively, assets with low power requirements may be identified for additional utilization.

Although the illustrated embodiment shows Power Scheme component analysis, the component analysis KPI may similarly be calculated and displayed for resource utilization. This may provide an easier way to spot assets that are either over- or under-utilized. Based on this information, a user can more easily rearrange or re-configure assets.

Alternatively, some greenness attributes may not be able to be represented by numerical values. These attributes may include, but are not limited to BIOS settings and standards compliance. For these attributes, KPIs may be calculated using inventory counts at step 612.

For instance, a System BIOS, or Basic Input/Output System, is a de facto standard defining a firmware interface. While it may be helpful to a user to view greenness KPIs relating to BIOS, attributes relating to BIOS are not easily quantifiable into numerical values. For instance it may be useful to know the distribution of BIOS versions. Therefore, the user may be presented with an inventory count of assets having each particular BIOS version.

Additionally, there may be a KPI for BIOS processor power technologies. These technologies allow the clock speed of a processor to be dynamically changed by software, allowing the processor to meet instantaneous performance needs for an operation, while minimizing power consumption and heat dissipation. This KPI allows the user to see the inventory count of assets using each particular kind of processor power technologies.

Additionally, there may be a KPI for BIOS advanced control and power interface (ACPI) setting. The ACPI specification is an open standard for unified, OS-centric device configuration and power management that allows controlling power states. This KPI allows the user to see the inventory count of assets on which ACPI is enabled.

Additionally, as greenness considerations become more widespread, there may be various standards for measuring greenness of IT assets. These may include, but are not limited to Energy Star 4, Energy Star 5, and Blue Angel. A KPI may allow the user to see the inventory count of assets that comply with these various green standards.

Finally, at step 614, the various KPIs are presented to the user in a graphical user interface. This step may be performed concurrently with the steps described above. Alternatively, this step may be performed separately each time the user requests different information. It should be understood that some of the steps illustrated in FIG. 6 may be combined, modified, or deleted where appropriate, and additional steps may also be added to the flow diagram.

In addition to the advantages enumerated above, various embodiments of the present disclosure provide other benefits. In general, the present disclosure may allow an IT administrator to more easily view and understand the power consumption and energy efficiency of various IT resources throughout an organization. This may provide an automated, organized way to determine improved configurations for improved power and cost savings. Various other advantages may be readily apparent to one having skill in the art.

Although the present invention has been described in detail, it should be understood that various changes, substitutions, and alterations can be made without departing from the spirit and scope of the invention as defined by the appended claims.

What is claimed is:

1. A computer-implemented method, comprising:
   extracting asset data from a plurality of information technology (IT) assets located on a network;
   extracting one or more greenness attributes from each of the plurality of IT assets;
   calculating, using a processor, key performance indicators, using the one or more greenness attributes, for each of the plurality of IT assets;
   presenting the key performance indicators to a user in a graphical user interface; and
   wherein calculating key performance indicators comprises:
      determining, based on the plurality of IT assets, a greenness baseline value associated with each greenness attribute;
      calculating, for each IT asset, a deviation from the greenness baseline value for each greenness attribute; and
      averaging, for each IT asset the deviations from each greenness baseline value to determine a drift value; and
   wherein presenting the key performance indicators comprises displaying the drift value for each IT asset.

2. The method of claim 1, wherein:
   calculating key performance indicators further comprises performing principle component analysis on the asset data to map each IT asset onto a two-dimensional graph; and
   wherein presenting the key performance indicators further comprises:
      displaying the two-dimensional graph to the user; and
      displaying each IT asset on the two-dimensional graph, wherein each IT asset is represented by an icon having a color, and wherein the color of the icon represents an overall greenness of the asset.

3. The method of claim 1, wherein the asset data comprises a plurality of non-numerical categories; and wherein calculating key performance indicators further comprises determining an inventory count of IT assets within each of the plurality of non-numerical categories.

4. The method of claim 1, further comprising:
   receiving from the user a request to focus on a particular subset of IT resources; and
   updating the graphical user interface to display key performance indicators for the particular subset of IT resources.

5. A system, comprising:
   one or more processors;
   memory coupled to the one or more processors and configured to store program instructions, the program instructions being executable by the one or more processors to implement:
      extracting asset data from a plurality of information technology (IT) assets located on a network;
      extracting one or more greenness attributes from each of the plurality of IT assets;
      calculating key performance indicators, using the one or more greenness attributes, for each of the plurality of IT assets; and
      presenting the key performance indicators to a user in a graphical user interface; and
   wherein calculating key performance indicators comprises:
      determining, based on the plurality of IT assets, a greenness baseline value associated with each greenness attribute;
      calculating, for each IT asset, a deviation from the greenness baseline value for each greenness attribute; and
      averaging, for each IT asset the deviations from each greenness baseline value to determine a drift value; and
   wherein presenting the key performance indicators comprises displaying the drift value for each IT asset.

6. The system of claim 5, wherein:
   calculating key performance indicators further comprises performing principle component analysis on the asset data to map each IT asset onto a two-dimensional graph; and
   wherein presenting the key performance indicators further comprises:
      displaying the two-dimensional graph to the user; and
      displaying each IT asset on the two-dimensional graph, wherein each IT asset is represented by an icon having a color, and wherein the color of the icon represents an overall greenness of the asset.

7. The system of claim 5 wherein the asset data comprises a plurality of non-numerical categories; and wherein calculating key performance indicators further comprises determining an inventory count of IT assets within each of the plurality of non-numerical categories.

8. The system of claim 5, wherein the program instructions are further executable by the one or more processors to implement:
   receiving from the user a request to focus on a particular subset of IT resources; and
   updating the graphical user interface to display key performance indicators for the particular subset of IT resources.

9. Non-transitory computer readable medium containing computer instructions stored thereon for causing a computer processor to perform:
   extracting asset data from a plurality of information technology (IT) assets located on a network;
   extracting one or more greenness attributes from each of the plurality of IT assets;
   calculating key performance indicators, using the one or more greenness attributes, for each of the plurality of IT assets;
   presenting the key performance indicators to a user in a graphical user interface;

wherein calculating key performance indicators comprises:
　　determining, based on the plurality of IT assets, a greenness baseline value associated with each greenness attribute;
　　calculating, for each IT asset, a deviation from the greenness baseline value for each greenness attribute; and
　　averaging, for each IT asset the deviations from each greenness baseline value to determine a drift value; and
wherein presenting the key performance indicators comprises displaying the drift value for each IT asset.

10. The medium of claim 9, wherein:
calculating key performance indicators further comprises performing principle component analysis on the asset data to map each asset onto a two-dimensional graph; and
wherein presenting the key performance indicators further comprises:
　　displaying the two-dimensional graph to the user; and
　　displaying each IT asset on the two-dimensional graph, wherein each IT asset is represented by an icon having a color, and wherein the color of the icon represents an overall greenness of the asset.

11. The medium of claim 9, wherein the asset data comprises a plurality of non-numerical categories; and wherein calculating key performance indicators further comprises determining an inventory count of IT assets within each of the plurality of non-numerical categories.

12. The medium of claim 9, wherein the logic is further operable when executed on a processor to implement:
　　receiving from the user a request to focus on a particular subset of IT resources; and
　　updating the graphical user interface to display key performance indicators for the particular subset of IT resources.

13. A computer-implemented method, comprising:
　　extracting asset data from a plurality of information technology (IT) assets located on a network;
　　extracting one or more greenness attributes from each of the plurality of IT assets;
　　calculating, using a processor, key performance indicators, using the one or more greenness attributes, for each of the plurality of IT assets;
　　presenting the key performance indicators to a user in a graphical user interface; and
　　wherein calculating key performance indicators comprises:
　　　　calculating standardization scores, using the one or more greenness attributes, for each IT asset;
　　　　defining a plurality of groups, wherein each group corresponds to an energy efficiency level; and
　　　　assigning each of the IT assets to a respective group based on the standardization score of the IT asset; and
wherein presenting the key performance indicators comprises displaying the number of IT assets assigned to each respective group.

14. A system, comprising:
one or more processors;
memory coupled to the one or more processors and configured to store program instructions, the program instructions being executable by the one or more processors to implement:
　　extracting asset data from a plurality of information technology (IT) assets located on a network;
　　extracting one or more greenness attributes from each of the plurality of IT assets;
　　calculating key performance indicators, using the one or more greenness attributes, for each of the plurality of IT assets; and
　　presenting the key performance indicators to a user in a graphical user interface; and
wherein calculating key performance indicators comprises:
　　calculating standardization scores, using the one or more greenness attributes, for each IT asset;
　　defining a plurality of groups, wherein each group corresponds to an energy efficiency level;
　　assigning each of the IT assets to a respective group based on the standardization score of the IT asset; and
wherein presenting the key performance indicators comprises displaying the number of IT assets assigned to each respective group.

15. Non-transitory computer readable medium containing computer instructions stored thereon for causing a computer processor to perform:
　　extracting asset data from a plurality of information technology (IT) assets located on a network;
　　extracting one or more greenness attributes from each of the plurality of IT assets;
　　calculating key performance indicators, using the one or more greenness attributes, for each of the plurality of IT assets;
　　presenting the key performance indicators to a user in a graphical user interface;
wherein calculating key performance indicators comprises:
　　calculating standardization scores, using the one or more greenness attributes, for each IT asset;
　　defining a plurality of groups, wherein each group corresponds to an energy efficiency level;
　　assigning each of the IT assets to a respective group based on the standardization score of the IT asset; and
wherein presenting the key performance indicators comprises displaying the number of IT assets assigned to each respective group.

\* \* \* \* \*